Oct. 22, 1929.    J. A. R. BENNET    1,732,630

MANUFACTURE OF PISTON RINGS

Filed Jan. 14, 1922

Inventor
J. A. R. Bennet
by [signature]
Att'y

Patented Oct. 22, 1929

1,732,630

UNITED STATES PATENT OFFICE

JULES AXEL RUTGER BENNET, OF LUND, SWEDEN

MANUFACTURE OF PISTON RINGS

Application filed January 14, 1922, Serial No. 529,276, and in Sweden August 20, 1921.

This invention relates to improvements in the manufacture of piston rings, and refers more particularly to the manufacture of split piston rings which when compressed to working size in a true cylinder exert a uniform pressure against the cylinder walls at every point of the latter. In order to obtain perfect tightness between the piston and the cylinder wall it is an indispensable condition that the piston ring or rings rest perfectly against the cylinder wall in such a way that the fluid cannot in any place pass between said members. For this purpose the ring must have a correct shape when in a free state and must also be elastic so that a definite pressure is exerted by the ring upon the cylinder wall, and this pressure ought to be uniformly distributed along the whole circumference.

Whatever may be the nature of the ring in other respects, it is necessary for obtaining a perfect tightness that the ring assume a circular form by its own tension when it is inserted in place and exposed to the forces acting on it, but this does not mean that the ring has necessarily had a circular outline during its manufacture. After the ring has been split it must not be exposed to any treatment apt to substantially strain the material, and therefore no turning is permissible—at most, a grinding after splitting. If the ring, nevertheless, is to assume a circular shape after it has been split and put into place in the piston and the cylinder, it must from the very beginning be turned into a shape such that it will assume a circular form when put in place.

According to the present invention the radius of curvature of the curve formed by the ring in a free state may be accurately determined to make the ring when inserted into a cylinder assume a circular form and exert a uniform pressure along the entire circumference.

Figure 1:
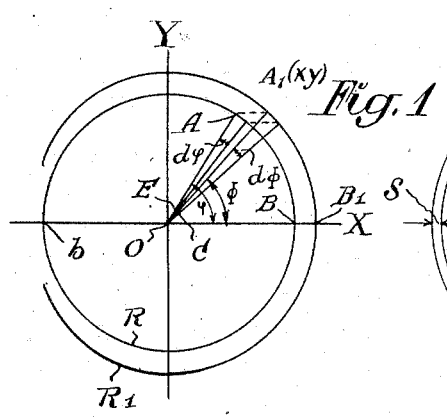
Figure 1:
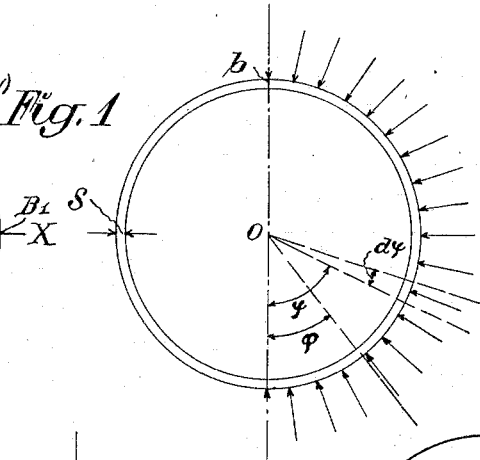
Figure 2:
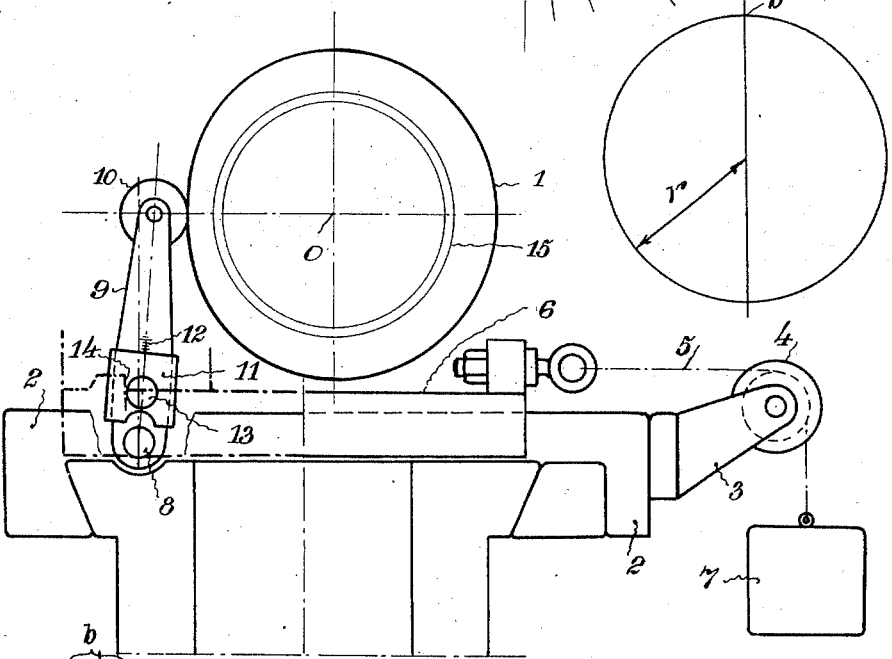
Figure 2:
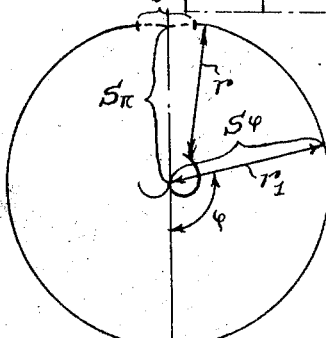

The invention is illustrated in the accompanying drawings in which:

Fig. 1 shows a piston ring compressed to working size, split at $b$;

Figs. 1ª, 1ᵇ and 1ᶜ are diagrammatic views supplementing the mathematical derivations; and Fig. 2 is a diagrammatic view of an arrangement for carrying out the process.

The invention resides in the production of a split metal piston ring that will exert substantially equal pressure at all circumferential points when inserted into an engine cylinder—in other words, when constrained into circular form. When free, the split ring springs apart, forming a somewhat heart-shaped outline. If the exact form of this free curve is determined, it becomes possible to turn rings having this free curve outline in a lathe or the like, the removal of the small superfluous piece at the region of the split then producing a split ring having a contour which will result in the desired ring characteristics when introduced into an engine cylinder.

The mathematical calculations may be summarized as follows:

Assume that—

$r_1$ = the radius of curvature of the median line of the ring in a free state at an arbitrary section of the same, $r$ = the radius of curvature at the same place of the median line of the ring when inserted into a cylinder, $M$ = the bending moment acting upon the ring in the said section, $\theta$ = the moment of inertia of the same section, $\alpha$ = the coefficient of elongation of the material, i. e., the reciprocal of the modulus of elasticity for tension of the ring material, and that the height of the section is small as compared with the radius of curvature, the following equation is applicable:

$$\frac{1}{r} = \frac{1}{r_1} + \frac{M}{\theta} \cdot \alpha$$

On the presumption that the pressure of the ring against the cylinder wall in all places is going to have one and the same value $p$, and that the radial thickness $s$ of the ring is so small in relation to $r$ that $r$ may be considered the radius of the cylinder bore, the following formula is obtained for the section determined by the angle $\varphi$ at the center of the ring, Fig. 1, $$M = \int_\varphi^\pi p.h.r.r.\ \sin(\psi-\varphi)d\psi$$

$$= p.h.r^2(1+\cos\varphi),$$ wherein $h$ is the height of the ring, the leverage being equal to $r\sin(\psi-\varphi)$.

By inserting this value in the preceding equation and substituting $\frac{1}{12}hs^3$ for $\theta$, the equation is obtained:

$$r_1 = \frac{s^3 r}{s^3 - 12pr^3(1+\cos\varphi)\cdot\alpha}$$

which indicates the radius of curvature that the curve formed by the ring in a free state ought to have at each point in order that the ring in its proper place in the cylinder may assume a circular form.

This radius of curvature is not the same as the radius vector leading to the point in question from the geometric center O of the ring. This radius vector may be determined for each point on the supposition that the length of the arcs AB and $A_1B_1$, Fig. 1ª, the point A on the compressed ring corresponding to the point $A_1$ of the free ring, corresponding to the angles $\varphi$ and $\Phi$ are equal. A very close approximation to the theoretical value of the radius vector may also be obtained by asuming that the angles $\varphi$ and $\Phi$ are equal, since these angles correspond to the same point on the compressed and free ring.

Since the known relations between the radius of curvature and the coordinates $x, y$, for any point A are $$r_1 = \frac{\left[1+\left(\frac{dy}{dx}\right)^2\right]^{3/2}}{\frac{d^2y}{dx^2}},$$

and $$(1+\cos\varphi) = 1 + \frac{\frac{dy}{dx}}{\left[1+\left(\frac{dy}{dx}\right)^2\right]^{1/2}},$$

if these values are substituted in the formula for $r_1$, the following differential equation is obtained:

$$\frac{\frac{d^2y}{dx^2}}{\left[1+\left(\frac{dy}{dx}\right)^2\right]^{3/2}} = \frac{S^3 - 12pr^3\alpha\left\{1+\frac{\frac{dy}{dx}}{\left[1+\left(\frac{dy}{dx}\right)^2\right]^{1/2}}\right\}}{S^3 r}$$

The curve of the free ring is obtained by integrating this equation, to obtain the coordinates $x, y,$ for each point of the curve. This integration gives the values $$x = r_0 - \frac{r\frac{\pi}{2}\cdot r\pi}{r\frac{\pi}{2}-r\pi}\cdot\log\text{nat}\frac{r_0}{r_1},\ y = \frac{r\frac{\pi}{2}\cdot r\pi}{r\frac{\pi}{2}-r\pi}\left[2\frac{\sqrt{r_0\cdot r\pi}}{r\frac{\pi}{2}}\cdot\text{arctg}\left(\sqrt{\frac{r_0}{r\pi}}\cdot\tan\frac{\varphi}{2}\right)\right]$$

$$y = \frac{r\frac{\pi}{2}\cdot r\pi}{r\frac{\pi}{2}-r\pi}\left[2\frac{\sqrt{r_0\cdot r\pi}}{r\frac{\pi}{2}}\cdot\text{arctg}\left(\sqrt{\frac{r_0}{r\pi}}\cdot\text{tg}\frac{\varphi}{2}\right)\right]$$

wherein $r_0, r\frac{\pi}{2}$, etc., represent the radius of curvature for the point at which the angle $\varphi$ is $0, \frac{\pi}{2}$, etc. This radius of curvature is calculated by means of the first formula. Having determined $x$ and $y$, the radius vector S is obtained, as $$S = \sqrt{x^2+y^2}.$$

It is, however, possible to obtain the form of the free ring curve in another way. Since the arc $B_1A_1$ is equal to $\int_0^\Psi r_1 d\psi$, therefore $d(B_1A_1)$ equals $r_1 d\Psi$, and if the value $\frac{12pr^3}{s^3}$, which is a constant for a given ring, is called $b$, $$d(B_1A_1) = \frac{rd\varphi}{1-b-b\cos\varphi},$$

and $$x = r_0 - r\int_0^\varphi \frac{\sin\varphi d\varphi}{1-b-b\cos\varphi}$$

which integrates to the expression $$x = r_0 - \frac{r}{b}\log\text{nat}\frac{1-b-b\cos\varphi}{1-2b}$$

$y$, which is equal to $$r \int_0^\varphi \frac{\cos\varphi \, d\varphi}{1-b-b\cos\varphi},$$

becomes equal to $$\frac{r}{b}\left[2 - \frac{1-b}{\sqrt{1-2b}} \operatorname{arctg}\left(\frac{1}{\sqrt{1-2b}} \operatorname{tg} \frac{\varphi}{2}\right) - \varphi\right]$$

The curve thus obtained approximates the theoretically correct form to produce a commercial ring having the desired characteristics. This curve, if desired, may also be graphically determined by calculating values of $r$ for successive values of $\varphi$ and then plotting each radius vector from the preceding one, using the calculated radii of curvature.

Having once determined the theoretical curve, a cam template having an outline corresponding to the theoretical curve may be used for direct copying in a lathe or the like, but it is preferred to use a cam template for producing rings of any predetermined characteristics, this cam template having its circumference, point by point, determined by the formula $R\varphi = R\pi + a(S\varphi - S\pi)$, in which $R\varphi$ indicates the radius of the template in an arbitrary point, i. e., the distance between such a point and the origin, $R\pi$ = the shortest radius of the template, which may be chosen as large as the dimensions of the lathe permit, $a$ = a coefficient, this coefficient expressing a relation on which the accuracy also depends, the accuracy increasing with $a$, $S\varphi$ = the radius of the piston ring at the point corresponding to $R$ (calculated according to the formula above), and $S\pi$ = the shortest radius of the piston ring, which is the same as the radius of the cylinder bore. The word radius as used above represents the distance of the point in question from the origin 0.

The curve of this cam template is thus quite different from the theoretical curve for the piston ring, but a piston ring having any predetermined characteristics may be formed by means of this cam template. An example of the use of the special cam template follows:

A template is to be constructed in which the difference between the largest radius vector $R_0$ and the shortest radius vector $R\pi$ of the template is to be 60 mm. $R_0$ is to be 438 mm. A ring is chosen for a cylinder having a radius of 200 mm., the ring thickness being 12.5 mm., and the ring pressure 0.326 kg. per cm.$^2$.

The calculation for this ring gives the following results: $S_0 = 208.33334$ mm. and $S\pi = 199.46006$ mm.; $a$ is therefore calculated to be 6.7618851, and the radius of the cam template at various degrees is figured:

$R_0 = 438.0000$
$R_{30} = 437.9022$
$R_{60} = 436.5236$
$R_{90} = 431.2375$
$R_{120} = 419.5213$
$R_{150} = 400.8754$
$R_{180} = 378.000$

The adjustment of the lathe, i. e., the value of $a$ for any other ring is then obtained as in the following example. The value of the constant is to be obtained for a piston ring for a cylinder diameter of 200 mm., a thickness 3.75 mm., and a specific pressure 0.326 kg./cm.$^2$. A calculation of $S_0$ and $S\pi$ for this ring gives the result $S_0 - S\pi$ equals 2.66198; the constant $a^1$ is therefore 22.53958. To check the result $S\frac{\pi}{2}$ is calculated theoretically as equal to 62.1999786 mm. The template gives $431.2375 - 378 = 22.53958/(S\frac{\pi}{2} - 59.838018)$, and $S\frac{\pi}{2} = 62.1999742$. The difference in the sixth decimal place is due to the calculation only, as the term $12pr^3a/s^3$, which may be called $g$, has the same value for the two rings specified.

If in another example a piston ring is to be formed for a cylinder diameter of 120 mm. and a specific pressure of 0.208 kg./cm.$^2$ the value of $g$ for such a ring will be very different from the value of $g$ for the originally designed ring. In the same manner as before, $a^1$ is determined to be 17.57111. In controlling the result $S\frac{\pi}{2}$ is calculated from the template as equal to 62.7730313. If calculated theoretically, the result is equal to 62.7680820. The difference can therefore be neglected for practical use. It is therefore evident that any piston ring may be produced by means of the same template. The method of carrying this out mechanically will be evident from the following description.

The template 1 (Fig. 2) is mounted on a face plate or the like in a lathe in such a way that the point 0 coincides with the axis of rotation, of the spindle. A bracket 3 carrying a roller 4 is supported by the main saddle 2. A cord 5 running over said roller 4 is connected at one end with the cross slide 6 and is provided with a weight 7 at its other end. At the side of the main saddle 2 opposite the roller 4 is a lever 9 pivoted on a horizontal shaft 8, said lever being directed upwards and at its upper end provided with a roller 10 on a level with the spindle or with the point 0 on the template 1. The lever 9 is pressed towards the spindle of the lathe by a surface 14 on the cross slide so that the roller 10 is pressed against the circumference of the template 1. As the latter rotates, therefore, the slide 6 will be moved backwards and forwards according as the roller 10 passes points on the circumference of the template situated at a longer or shorter distance from the axis of rotation. It is obvious that the top slide carrying the tool holder takes part in this movement backwards and forwards, causing the piston ring 15 carried by the face plate to be turned off to the theoretically correct form.

As the difference between the longest and shortest distance from the bounding curve of the template is known, any desired difference between the corresponding distances on the piston ring 15 to be formed may be obtained by different adjustments of the sleeve 11 along the lever 9. If for instance the sleeve 11 as shown in the drawing is adjusted in such a way that the distance between the axis of the roller 10 and the axis of the shaft 8 is five times as long as the distance between the latter and the journal 13, i. e., if the ratio of the leverage between the template and the cross slide is 5:1, it is obvious that the difference between the longest and shortest distance from the circumference of the template to the point 0 is in a ratio to the corresponding distances on the turned piston ring as 5:1. In forming a piston ring of any required dimensions this ratio of leverage should be the same as the determined value of $a_{\varepsilon}^{1}$, as described above.

The apparatus shown in Fig. 2 for the manufacture of piston rings is only intended to illustrate in what manner the invention may be performed in a simple way, and the apparatus may obviously be varied in different ways without digressing from the principle of the invention.

I claim:

1. A split piston ring which is radially larger than working size when free, and is circular when constrained to working size, the radius of curvature of the free ring at any point having the relation $$r_1 = \frac{s^3 r}{s^3 - 12 p r^3 \alpha (1 + \cos \varphi)}$$

wherein $r_1$ is the radius of curvature at a point subtending an angle $\varphi$, $r$ is the radius when constrained into circular form, $s$ is the ring thickness, $p$ is the ring pressure to be exerted on the cylinder walls, and $\alpha$ is the coefficient of elongation of the ring material.

2. A cam template for forming split piston rings which are radially larger than working size when free, but are circular when constrained to working size, the radius of curvature of the cam template at any point having the relation $$R_1 = \frac{c_1 R}{c_1 - c_2 R^3 (1 + \cos \varphi)}$$

wherein $R_1$ is the radius of curvature at a point subtending an angle $\varphi$, $R$ is the smallest radius of curvature, and $c_1$, $c_2$, are constants.

3. In the art of manufacturing split piston rings utilizing a cam template, the step of forming the piston ring so that the difference between any radius vector of the ring and the smallest radius vector of the ring is proportional to the difference between the corresponding radius vector of the cam template and the smallest radius vector of the cam template.

4. A cam template for manufacturing split piston rings which are radially larger than working size when free, but are circular when constrained to working size, and which exert substantially equal pressure at all circumferential points when so constrained, having a contour bearing the relation to the contour of a piston ring fulfilling such conditions, that the ratio of the difference between any radius vector of the cam template and the smallest radius vector of the cam template to the difference between the corresponding radius vector of the ring and the smallest radius vector of the ring, is a constant.

In testimony whereof, I have signed my name to this specification.

JULES AXEL RUTGER BENNET.